United States Patent
Chen et al.

(10) Patent No.: US 10,412,815 B2
(45) Date of Patent: Sep. 10, 2019

(54) LIGHTING SYSTEM AND MULTI-MODE LIGHTING DEVICE THEREOF AND CONTROLLING METHOD

(71) Applicant: Coretronic Corporation, Hsin-Chu (TW)

(72) Inventors: Chih-Chen Chen, Hsin-Chu (TW); Pei-Yu Li, Hsin-Chu (TW); Kuei-Chin Lai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/826,178

(22) Filed: Aug. 13, 2015

(65) Prior Publication Data
US 2016/0198552 A1 Jul. 7, 2016

(30) Foreign Application Priority Data
Jan. 6, 2015 (CN) .......................... 2015 1 0003958

(51) Int. Cl.
*H04N 9/31* (2006.01)
*H05B 37/02* (2006.01)
(Continued)

(52) U.S. Cl.
CPC ......... *H05B 37/0272* (2013.01); *G03B 21/26* (2013.01); *H04N 9/3141* (2013.01);
(Continued)

(58) Field of Classification Search
CPC . H04N 9/3141; H04N 9/3185; H05B 37/0227
(Continued)

(56) References Cited

U.S. PATENT DOCUMENTS

| 8,328,368 B2 | 12/2012 | Luciano |
| 8,751,049 B2 | 6/2014 | Linder et al. |

(Continued)

FOREIGN PATENT DOCUMENTS

| CN | 201282523 | 7/2009 |
| CN | 104035559 | 9/2014 |

(Continued)

OTHER PUBLICATIONS

"Office Action of China Counterpart Application," dated Oct. 11, 2017, p. 1-p. 15.

*Primary Examiner* — Jefferey F Harold
*Assistant Examiner* — Jean W Desir
(74) *Attorney, Agent, or Firm* — JCIPRNET (57) ABSTRACT

A lighting system and a multi-mode lighting device thereof are provided. The multi-mode lighting device includes a wireless communication unit, a lighting unit, a projection unit, and a processing unit. The processing unit is coupled to the wireless communication unit, the lighting unit, and the projection unit. The processing unit is configured to selectively operate in one of multiple modes, wherein the multiple modes include a lighting mode and a projection mode. The processing unit is adapted to control the lighting unit to provide illumination light when the processing unit operates in the lighting mode. The processing unit is adapted to receive a video signal provided by an electronic device via the wireless communication unit and control the projection unit to project an image based on the video signal when the processing unit operates in the projection mode.

25 Claims, 6 Drawing Sheets

(51) Int. Cl.
*G03B 21/26* (2006.01)
*G03B 21/14* (2006.01)
*G03B 17/54* (2006.01)

(52) U.S. Cl.
CPC ....... *H04N 9/3185* (2013.01); *H05B 37/0227* (2013.01); *G03B 17/54* (2013.01); *G03B 21/145* (2013.01); *G03B 2206/00* (2013.01)

(58) Field of Classification Search
USPC ......... 348/460, 552, 602, 553; 345/690, 156
See application file for complete search history.

(56) References Cited

U.S. PATENT DOCUMENTS

| | | | |
|---|---|---|---|
| 2011/0080335 A1* | 4/2011 | Unger | H04N 5/74 345/156 |
| 2012/0163828 A1 | 6/2012 | Lindberg et al. | |
| 2013/0002687 A1 | 1/2013 | Conti | |
| 2013/0163232 A1 | 6/2013 | Kasuga | |
| 2014/0022515 A1 | 1/2014 | Yamaguchi et al. | |
| 2014/0035964 A1 | 2/2014 | Kasuga | |
| 2014/0043516 A1 | 2/2014 | Baker | |
| 2014/0043544 A1 | 2/2014 | Kasuga | |
| 2014/0098303 A1 | 4/2014 | Kasuga | |
| 2015/0022788 A1* | 1/2015 | Shinha | H04N 9/3111 353/85 |

FOREIGN PATENT DOCUMENTS

| | | |
|---|---|---|
| CN | 104154440 | 11/2014 |
| CN | 104202865 | 12/2014 |

\* cited by examiner

LIGHTING SYSTEM AND MULTI-MODE LIGHTING DEVICE THEREOF AND CONTROLLING METHOD

CROSS-REFERENCE TO RELATED APPLICATION

This application claims the priority benefit of China application serial no. 201510003958.0, filed on Jan. 6, 2015. The entirety of the above-mentioned patent application is hereby incorporated by reference herein and made a part of this specification.

BACKGROUND OF THE INVENTION

Field of the Invention

The invention relates to a lighting device, and more particularly, relates to a lighting system, a multi-mode lighting device of the lighting system, and controlling method of the multi-mode lighting device.

Description of Related Art

With the continuous progress in technologies, as smart devices connected with Internet connectivity becomes a popular concept, functions for wireless connection control are gradually applied in the illumination lamps. Users may use an application in a smart phone for connecting to a lamp in order to turn on or turn off the lamp. During such operation, users perform steps of taking out the phone, establishing the connection, starting the application, and configuring settings each time before the lamp can be turned on or off. Moreover, when users intend to use a projector for watching videos, users often manually turn off the illumination lamp in order to reduce indoor brightness, resulting in waste of time and inconvenience.

Patents or patent application publications related to the lighting system may include, for example, US Patent Application Publication NO. 2014/0098303, US Patent Application Publication NO. 2014/0043516, US Patent Application Publication NO. 2013/0002687, U.S. Pat. Nos. 8,751,049, and 8,328,368.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention is directed to a lighting system and a multi-mode lighting device thereof, where the multi-mode lighting device includes a lighting unit and a projection unit. The multi-mode lighting device may selectively operate in one of multiple modes. For example, the multi-mode lighting device may selectively operate in a lighting mode to use the lighting unit to project an illumination light. Alternatively, the multi-mode lighting device may selectively operate in a projection mode to use the projection unit to project an image.

Other objects and advantages of the invention can be further illustrated by the technical features broadly embodied and described as follows.

To achieve one, a part, or all of the objects or other objects, a lighting system is proposed according to embodiments of the invention. The lighting system includes an electronic device and a multi-mode lighting device. The multi-mode lighting device includes a wireless communication unit, a lighting unit, a projection unit, and a processing unit. The wireless communication unit is configured to establish a connection with an electronic device. The lighting unit is configured to provide illumination light. The projection unit is configured to project an image. The processing unit is coupled to the wireless communication unit, the lighting unit, and the projection unit. The processing unit is configured to selectively operate in one of multiple modes, where the multiple modes include a lighting mode and a projection mode. The processing unit is adapted to control the lighting unit to provide the illumination light when the processing unit operates in the lighting mode. The processing unit is adapted to receive a video signal provided by the electronic device via the wireless communication unit and control the projection unit to project the image based on the video signal when the processing unit operates in the projection mode.

To achieve one, a part, or all of the objects or other objects, a multi-mode lighting device is proposed according to embodiments of the invention. The multi-mode lighting device includes a wireless communication unit, a lighting unit, a projection unit, and a processing unit. The wireless communication unit is configured to establish a connection with an electronic device external to the multi-mode lighting device. The lighting unit is configured to provide illumination light. The projection unit is configured to project an image. The processing unit is coupled to the wireless communication unit, the lighting unit, and the projection unit. The processing unit is configured to selectively operate in one of multiple modes, where the multiple modes include a lighting mode and a projection mode. The processing unit is adapted to control the lighting unit to provide the illumination light when the processing unit operates in the lighting mode. The processing unit is adapted to receive a video signal provided by the electronic device via the wireless communication unit and control the projection unit to project the image based on the video signal when the processing unit operates in the projection mode.

In an embodiment of the invention, the lighting unit includes at least one light emitting diode. The processing unit is configured to control the at least one light emitting diode to emit corresponding color light in the lighting mode.

In an embodiment of the invention, the processing unit is adapted to disable the projection unit and control the lighting unit to provide the illumination light when the processing unit operates in the lighting mode.

In an embodiment of the invention, the processing unit is adapted to control the projection unit to project an illumination image and control the lighting unit to provide the illumination light when the processing unit operates in the lighting mode.

In an embodiment of the invention, the processing unit is adapted to disable the lighting unit and control the projection unit to project the image based on the video signal when the processing unit operates in the projection mode.

In an embodiment of the invention, the multi-mode lighting device further includes a sensor unit. The sensor unit is coupled to the processing unit, and configured to sense an external event to provide a sensing signal to the processing unit.

In an embodiment of the invention, the processing unit is adapted to switch an operation mode to the projection mode when the processing unit determines the external event as a projection direction of the multi-mode lighting device that is within a first direction range. The processing unit is adapted to switch the operation mode to the lighting mode when the processing unit determines the external event as the projection direction of the multi-mode lighting device that is within a second direction range.

In an embodiment of the invention, the multi-mode lighting device further includes a motor control module. The motor control module is coupled to the processing unit, and is configured to adjust a projection direction of the projection unit or a rotation angle of the image projected from the projection unit under control of the processing unit.

In an embodiment of the invention, the processing unit is adapted to control the motor control module based on a sensing result of the sensor unit to adjust the rotation angle of the image projected from the projection unit to correct the image.

In an embodiment of the invention, the multi-mode lighting device further includes a power connector. The power connector is configured to connect a lamp base and supply power to the multi-mode lighting device. The power connector is locked into the lamp base by a rotating method.

In an embodiment of the invention, the sensor unit includes an image identification module. The image identification module is coupled to the processing unit, and is configured to sense an action of a user and provide an identification result to the processing unit. The processing unit is adapted to control operations of the multi-mode lighting device based on the identification result.

In an embodiment of the invention, the processing unit is configured to monitor the image, and is adapted to turn off the projection unit when the image is a still picture and maintained for a threshold duration.

In an embodiment of the invention, the processing unit is configured to receive a usage state provided by the electronic device via the wireless communication unit, and is adapted to turn off the projection unit when the usage state indicates that a screen of the electronic device is turned off and maintained for a threshold duration.

In an embodiment of the invention, the processing unit is configured to receive a user state provided by the electronic device via the wireless communication unit. The processing unit is adapted to turn off the projection unit when the user state indicates that a user is asleep.

In an embodiment of the invention, the multiple modes further include a night-lamp mode. The processing unit is adapted to switch an operation mode to the night-lamp mode to control the lighting unit to provide night-lamp light when the user state indicates that the user is asleep.

In an embodiment of the invention, the multi-mode lighting device further includes a speaker. The speaker is coupled to the processing unit, and is configured to emit a sound under control of the processing unit. The processing unit is adapted to turn down volume of the speaker when the user state indicates that the user is asleep.

In an embodiment of the invention, the multi-mode lighting device further includes a speaker. The speaker is coupled to the processing unit, and is configured to emit a sound under control of the processing unit. The processing unit is adapted to turn up volume of the speaker to wake up the user when the user state indicates that the user is asleep.

In an embodiment of the invention, the processing unit is configured to record and analyze an operation history of the multi-mode lighting device to obtain an operation habit, and automatically control operations of the multi-mode lighting device based on the operation habit.

In an embodiment of the invention, the processing unit is adapted to connect to a cloud database via the wireless communication unit and update the operation habit to the cloud database.

In an embodiment of the invention, the processing unit is adapted to connect to a cloud database via the wireless communication unit. The processing unit is configured to download an operation habit. The processing unit is adapted to automatically control operations of the multi-mode lighting device based on the operation habit.

In an embodiment of the invention, the processing unit is connected to an Internet of Things via the wireless communication unit. The processing unit is configured to receive state information from an external device on the Internet. The processing unit is adapted to automatically control operations of the multi-mode lighting device based on the state information.

In an embodiment of the invention, the processing unit is adapted to receive a wireless control signal from the electronic device via the wireless communication unit. The processing unit is adapted to selectively operates in one of the multiple modes based on the wireless control signal.

In an embodiment of the invention, the lighting system further includes a wearable device. The wearable device is configured to sense physiological information of the user, and provide the physiological information to the electronic device. The electronic device is adapted to generate the user state for the multi-mode lighting device based on the physiological information.

To achieve one, a part, or all of the objects or other objects, a controlling method of a multi-mode lighting device is proposed according to embodiments of the invention. The multi-mode lighting device includes a sensor unit and a processing unit. The controlling method includes: reading a sensing signal provided from the sensor unit by the processing unit, determining a projection direction of the multi-mode lighting device according to the sensing signal, and determining whether the projection direction of the multi-mode lighting device is within a first direction range.

In an embodiment of the invention, the controlling method further includes: determining whether the projection direction of the multi-mode lighting device is within a second direction range by the processing unit, and switching an operation mode to a lighting mode or a projection mode.

In an embodiment of the invention, the controlling method further includes: sensing a relationship between a projection unit of the multi-mode lighting device and a ground by using the sensor unit, determining whether an image projected from the projection unit is oblique, calculating an angle and a direction for a compensation, and correspondingly driving a motor control module of the multi-mode lighting device to rotate the projection unit so that the projection unit is corrected to project a horizontal image.

The multi-mode lighting device in one or more embodiments of the invention may selectively operate in one of the multiple modes. For example, the multi-mode lighting device may selectively operate in the lighting mode in order to use the lighting unit to project the illumination light. Alternatively, the multi-mode lighting device may selectively operate in the projection mode in order to use the projection unit to project the image. In some application examples, the multi-mode lighting device may automatically change the operation mode based on the external event. Accordingly, the lighting system and the multi-mode lighting device are capable of improving the convenience in use.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
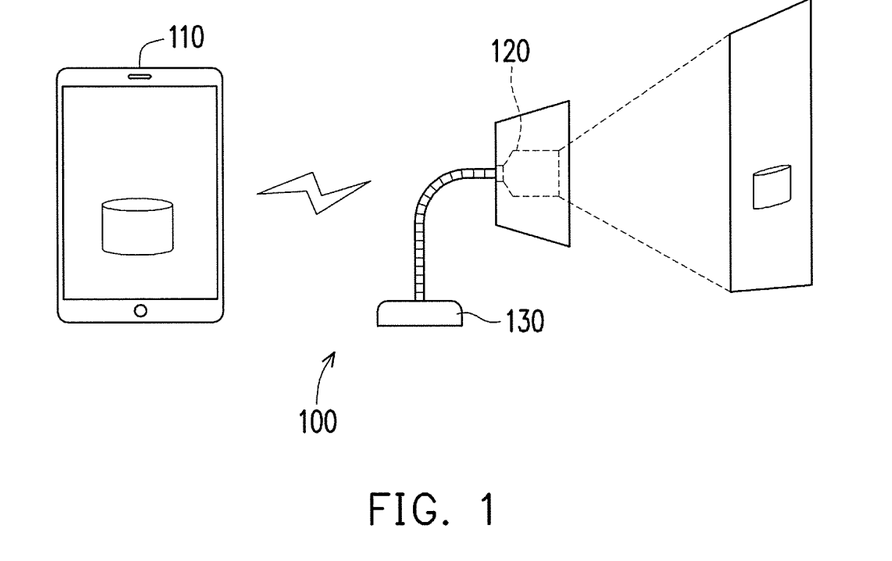
FIG. 1 is a schematic diagram illustrating a lighting system according to an embodiment of the invention.

FIG. 1 is a schematic diagram illustrating a lighting system 100 according to an embodiment of the invention. The lighting system 100 includes an electronic device 110 and a multi-mode lighting device 120. In the embodiment depicted in FIG. 1, the multi-mode lighting device 120 is installed on a lamp base 130. The lamp base 130 may supply power to the multi-mode lighting device 120. The lamp base 130 has an adjusting mechanism (not shown), such that the lamp base 130 may adjust a projection direction of light beams from the multi-mode lighting device 120. The adjusting mechanism of the lamp base 130 may be mechanisms with functions of two-dimensional adjustment or three-dimensional adjustment, such as a shaft-type rotating arm, a mechanical joint, a spherical joint, or a level adjustment base, but the invention is not limited thereto.

Figure 2:
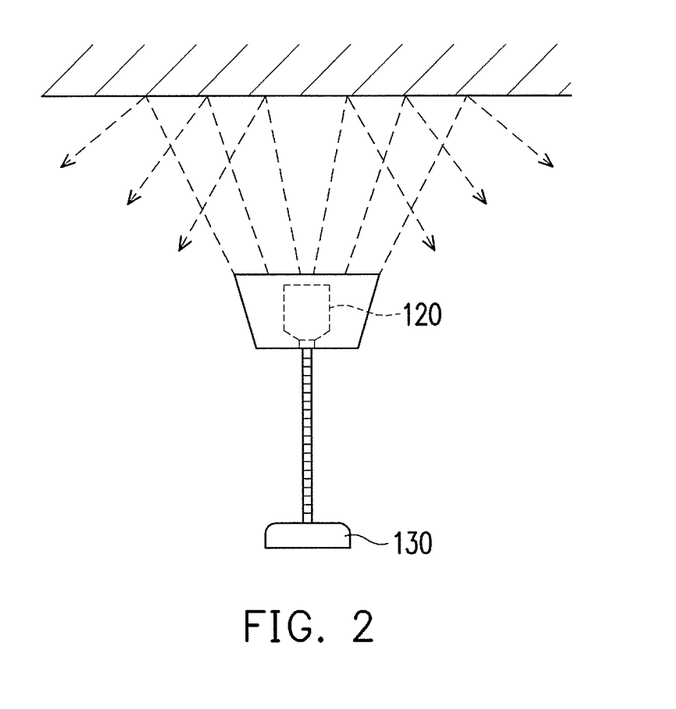
FIG. 2 is a schematic diagram illustrating a scenario where the projection direction of the multi-mode lighting device depicted in FIG. 1 faces toward a ceiling.

FIG. 2 is a schematic diagram illustrating a scenario where the projection direction of the multi-mode lighting device 120 depicted in FIG. 1 faces toward a ceiling. The lamp base 130 may change the projection direction of the multi-mode lighting device 120 so that the projection direction of the multi-mode lighting device 120 faces towards, for example, the ceiling (as shown in FIG. 2) or faces towards a wall (as shown in FIG. 1).

The multi-mode lighting device 120 installed on the lamp base 130 as depicted in either one of FIG. 1 and FIG. 2 is merely examples of application. In other embodiments, the multi-mode lighting device 120 may also be installed on a lamp base on the ceiling, a lamp base on the wall or lamp bases in other forms.

Referring to FIG. 1, based on different design requirements, the electronic device 110 may be any electronic communication equipments such as a smart phone, a tablet computer, a notebook computer, a wearable device, or other wireless communication platforms. The electronic device 110 may be connected to the multi-mode lighting device 120 in a wireless manner. The electronic device 110 may wirelessly transmit a photo, a video, music, a current image displayed on the electronic device 120, or other multimedia contents to the multi-mode lighting device 120. For instance, the electronic device 110 may transmit a video displayed on a screen of the electronic device 110 to the multi-mode lighting device 120. The multi-mode lighting device 120 may selectively operate in one of multiple modes. When the multi-mode lighting device 120 operates in a projection mode, the multi-mode lighting device 120 may project the video provided by the electronic device 110 onto the ceiling, the wall, or a projection screen. Accordingly, the multi-mode lighting device 120 may provide a larger image (compared with the image, for example, displayed on the screen of the electronic device 110) in any direction for a user to view or share with other people. When the multi-mode lighting device 120 operates in a lighting mode, the multi-mode lighting device 120 may provide illumination light to light up an indoor space. In some embodiments, the multi-mode lighting device 120 may provide light with high luminance and colorful light changes, so as to decorate the living space with colors. By using a control interface of the electronic device 110, the multi-mode lighting device 120 may set and memorize brightness and a color of the light.

Figure 3:
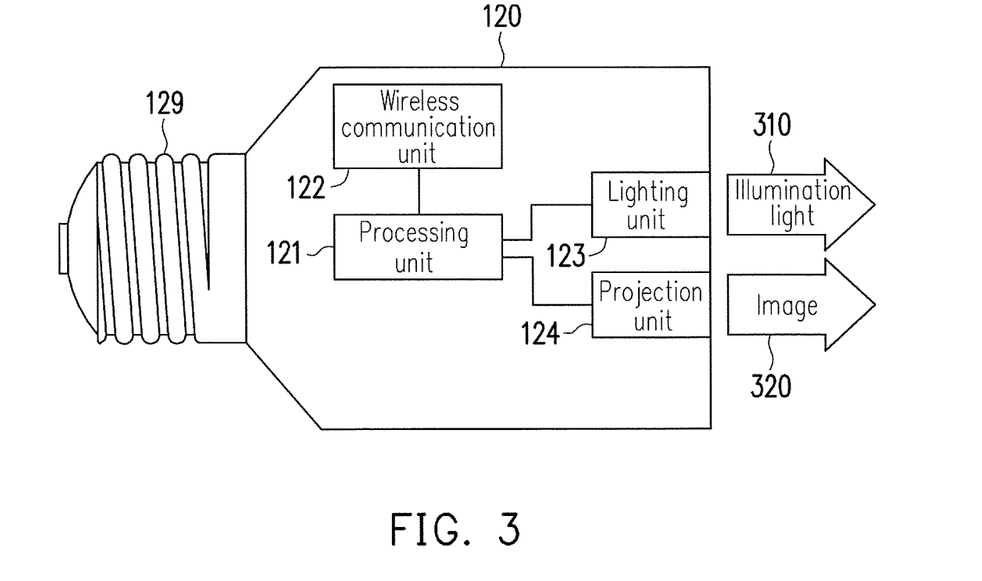
FIG. 3 is a block diagram illustrating circuitry of the multi-mode lighting device depicted in FIG. 1 according to an embodiment of the invention.

FIG. 3 is a block diagram illustrating circuitry of the multi-mode lighting device 120 depicted in FIG. 1 according to an embodiment of the invention. Referring to FIG. 3, the multi-mode lighting device 120 has a power connector 129. The power connector 129 may connect the lamp base 130 to supply power to the multi-mode lighting device 120. The power connector 129 may be locked into the lamp base 130 by rotating, plugging or other methods. For instance (but the invention is not limited thereto), the power connector 129 may be a base with one of specifications including the Edison Screw base, the Bayonet base, the Halogen base, the Fluorescents base or the Midget Flange base, such as E27, E26, E12, E14, B15, B22, G8, G9, . . . , and so on. The lamp base 130 matches the specification of the power connector 129 to be connected with the power connector 129. The lamp base 130 may supply power to the multi-mode lighting device 120 by the power connector 129.

The multi-mode lighting device 120 includes a processing unit 121, a wireless communication unit 122, a lighting unit 123, and a projection unit 124. The processing unit 121 is coupled to the wireless communication unit 122, the lighting unit 123, and the projection unit 124. The wireless communication unit 122 may establish a connection with the electronic device 110. The projection unit 124 may project an image 320. The lighting unit 123 may provide illumination light 310, which can be independent from the projection unit 124 having a light source (not shown) providing an image light of the projection unit 124. The light source of the projection unit 124 may include, for example, a light emitting diode, a laser diode, or a solid state light source, but the invention is not limited thereto. In addition to including the light source to provide image light, the projection unit 124 may further include a light valve and a projection lens. The wireless communication unit 122, for example, is a chip or circuit supporting wireless fidelity (Wi-Fi), blue tooth, near field communication, or other suitable wireless transmission. The processing unit 121, for example, includes a central processing unit (CPU) of single-core or multi-core, or a microprocessor, a digital signal processor (DSP), a programmable controller, or a chipset for general purpose or special purpose. The processing unit 121 may be adapted to control and/or operate the projection unit 124 and the lighting unit 123. In some embodiment, the multi-mode lighting device 120 may also include one or more memories (not shown) connected with the processing unit 121 to buffer or store signals from the wireless communication unit 122, or to store the settings of the multi-mode lighting device 120.

The processing unit 121 may selectively operate in one of multiple modes, where the multiple modes include the lighting mode and the projection mode. In some embodiments, when the processing unit 121 operates in the lighting mode, the processing unit 121 may control the lighting unit 123 to provide the illumination light 310 with high luminance (e.g. highest luminance that the lighting unit 123 can be illuminated) and disable the projection unit 124. The way of disabling the projection unit 124, for example, may be disabling the power to the projection unit 124, disabling the power to the light source of the projection unit 123, or disabling the video signal to the projection unit 124, but the invention is not limited thereto. In some other embodiments, when the processing unit 121 operates in the lighting mode, the processing unit 121 may control the projection unit 124 to project an illumination image (e.g., a single color image with high luminance), and control the lighting unit 123 to provide the illumination light with high luminance.

When the processing unit 121 operates in the projection mode, the processing unit 121 may receive a video signal provided by the electronic device 110 via the wireless communication unit 122, and control the projection unit 124 to project the image 320 based on the video signal. In some embodiments, when the processing unit 121 operates in the projection mode, the processing unit 121 may simultaneously maintain the projection unit 124 and the lighting unit 123 in a turned-on state, and may control the lighting unit 123 to reduce the brightness of the illumination light 310 or change the color thereof, based on demands of the user. In some other embodiments, when the processing unit 121 operates in the projection mode, the processing unit 121 may disable the lighting unit 123 to stop providing the illumination light 310.

In some embodiments, when the processing unit 121 operates in the lighting mode, the processing unit 121 may control the projection unit 124 to project an illumination image (e.g., a single color image with high luminance), and control the lighting unit 123 to provide the illumination light with a first luminance. When the processing unit 121 operates in the projection mode, the processing unit 121 may control the projection unit 124 to project an image while reducing the brightness of the illumination light 310 to a second luminance which lower than the first luminance. The second luminance may be zero or greater than zero.

Based on different design requirements, the lighting unit 123 may include a light emitting diode or other light emitting elements. In the lighting mode, the processing unit 121 may control the light emitting diode (or other light emitting elements) to emit corresponding color light beams. For instance, when the user is working or reading, the processing unit 121 may control the lighting unit 123 to emit the illumination light of white color. When the user is hosting a party, the processing unit 121 may control the lighting unit 123 to emit the illumination light 310 that changes color over time. Furthermore, the brightness of the illumination light 310 emitted by the lighting unit 123 may also be changed likewise.

The processing unit 121 may receive a wireless control signal from the electronic device 110 via the wireless communication unit 122. According to the wireless control signal of the electronic device 110, the processing unit 121 may selectively operate in one of the multiple modes. In some application scenarios such as gathering with friends, the user may wish to share videos/photos taken in the recent trip with friends. As such, the user may turn on a power switch of the multi-mode lighting device 120, so that the processing unit 121 and the wireless communication unit 122 of the multi-mode lighting device 120 may enter a state of pending for connection. At this time, the user simply starts the control interface of the electronic device 110 to conduct a wireless connection with the multi-mode lighting device 120, so that the electronic device 110 may then transmit the videos/photos to the processing unit 121 of the multi-mode lighting device 120. Accordingly, the projection unit 124 of the multi-mode lighting device 121 may then project an image (e.g., the videos/photos) of the electronic device 110.

When the user intends to relax after the gathering is over, the user can simply use the control interface of the electronic device 110 (e.g., a cell phone) to transmit a command (the wireless control signal) to the multi-mode lighting device 120, so as to switch an operation mode of the multi-mode lighting device 120 from the projection mode to the lighting mode. The processing unit 121 of the multi-mode lighting device 120 can control the lighting unit 123 to change the color of the light based on a received command parameter. The switching of operation modes as described above may also be automatically executed by the processing unit 121.

Figure 4:
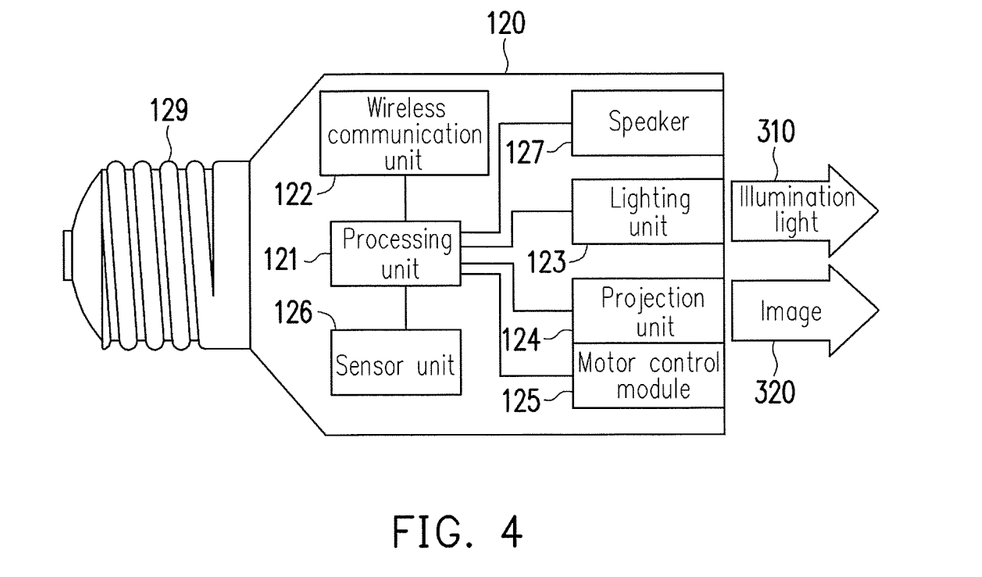
FIG. 4 is a block diagram illustrating circuitry of the multi-mode lighting device depicted in FIG. 1 according to another embodiment of the invention.

FIG. 4 is a block diagram illustrating circuitry of the multi-mode lighting device 120 depicted in FIG. 1 according to another embodiment of the invention. The multi-mode lighting device 120 depicted in FIG. 4 includes a processing unit 121, a wireless communication unit 122, a lighting unit 123, a projection unit 124, a motor control module 125, and a sensor unit 126. The multi-mode lighting device 120, the processing unit 121, the wireless communication unit 122, the lighting unit 123, and the projection unit 124 as depicted in FIG. 4 may refer to related descriptions of FIG. 1 to FIG. 3.

Referring to FIG. 4, the sensor unit 126 is coupled to the processing unit 121. The sensor unit 126 may sense an external event in order to provide a sensing signal to the processing unit 121. For instance (but the invention is not limited thereto), the sensor unit 126 may include a light sensor, a motion sensor, or a time of flight (TOF) sensor. The motion sensor may be, for example, a G-sensor, an acceleration sensor, a gyro sensor, a magnetic sensor, an electronic compass, or other motion sensing circuits/elements. The sensor unit 126 may sense the projection direction of the light (illumination light and/or image light) from the multi-mode lighting device 120 when the sensor unit 126 includes a motion sensor.

When the processing unit 121 determines the external event as that the projection direction of the multi-mode lighting device 120 is within a first direction range based on the sensing signal provided by the sensor unit 126, the processing unit 121 may automatically switch the operation mode to the projection mode (or is maintained at the projection mode if it is currently at the projection mode). The projection direction is, for example, an orientation or a posture of the multi-mode lighting device 120 with respect to a horizontal level. For instance, taking the scenario depicted in FIG. 1 as an example and assuming that a horizontal level is set to be 0°. When the projection direction of the multi-mode lighting device 120 is within a range from −45° to 45° (the first direction range), the processing unit 121 may automatically switch the operation mode to the projection mode (or is maintained at the projection mode if it is currently at the projection mode). In some other embodiments, when the projection direction of the multi-mode lighting device 120 is within a range from −60° to 60° (the first direction range), the processing unit 121 may automatically switch the operation mode to the projection mode. The multi-mode lighting device 120 may use the projection unit 124 to project an image 320 on a wall or a projection screen in the projection mode.

When the processing unit 121 determines the external event as that the projection direction of the multi-mode lighting device 120 is within a second direction range based on the sensing signal provided by the sensor unit 126, the processing unit 121 switches the operation mode to the lighting mode (or is maintained at the lighting mode if it is currently at the lighting mode). For instance, taking the scenario depicted in FIG. 2 as an example and assuming that a horizontal level is set to be 0°. When the projection direction of the multi-mode lighting device 120 is within a range from 45° to 135° (the second direction range), the processing unit 121 may automatically switch the operation mode to the lighting mode (or is maintained at the lighting mode if it is currently at the lighting mode). In some other embodiments, when the projection direction of the multi-mode lighting device 120 is within a range from 60° to 120° (the second direction range), the processing unit 121 may automatically switch the operation mode to the lighting mode. The multi-mode lighting device 120 may use the lighting unit 123 to project the illumination light 310 in the lighting mode.

The first direction range and the second direction range may be decided based on user habits, and may be configured in the multi-mode lighting device 120, such as storing the first direction range and the second direction range in a memory of the multi-mode lighting device 120 or programming the first direction range and the second direction range to the processing unit 121. For example, assuming that the user is used to project the image 320 onto the ceiling so that the user may watch the image when lying on the bed, the first direction range may be defined as −10° to −90°, whereas the second direction range may be defined as −10° to 190°.

Figure 5:
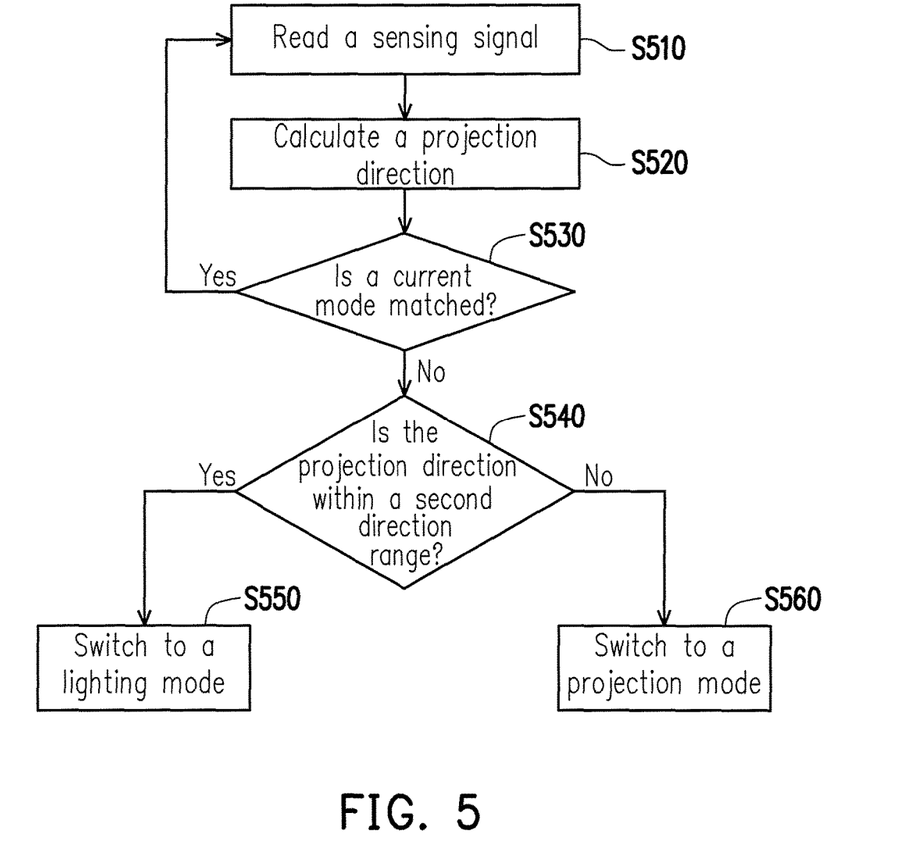
FIG. 5 is a flowchart illustrating operations of automatically switching the operation mode by the multi-mode lighting device depicted in FIG. 4 according to an embodiment of the invention.

FIG. 5 is a flowchart illustrating operations of automatically switching the operation mode by the multi-mode lighting device 120 depicted in FIG. 4 according to an embodiment of the invention. The processing unit 121 reads the sensing signal provided by the sensor unit 126 in step S510, and calculates and/or determines the projection direction of the multi-mode lighting device 120 based on the sensing signal in step S520. In step S530, the processing unit 121 may determine whether the projection direction of the multi-mode lighting device 120 matches a current mode. For instance, assuming that the current mode is the projection mode, the processing unit 121 may determine whether the projection direction of the multi-mode lighting device 120 is within the first direction range, so as to determine whether the operation mode corresponding to the projection direction matches the current mode. Assuming that the current mode is the lighting mode, the processing unit 121 may determine whether the operation mode corresponding to the projection direction of the multi-mode lighting device 120 is within the second direction range, so as to deter mine whether the projection direction matches the current mode. When determining that the operation mode corresponding to the projection direction of the multi-mode lighting device 120 matches the current mode, the processing unit 121 may execute steps S510 to S530 again.

When determining that the projection direction of the multi-mode lighting device 120 does not match the current mode in step S530, the processing unit 121 may execute step S540 to determine whether the projection direction of the multi-mode lighting device 120 is within the second direction range. When the projection direction of the multi-mode lighting device 120 is within the second direction range, the processing unit 121 may execute step S550 to automatically switch the operation mode to the lighting mode. When determining that the projection direction of the multi-mode lighting device 120 is not within the second direction range in step S540, the processing unit 121 may execute step S560 to automatically switch the operation mode to the projection mode.

Therefore, in addition to receiving and processing the signal from the wireless communication unit 122 to control and/or operate the projection unit 124 and/or the lighting unit 123, in one embodiment, the processing unit 121 is also adapted to receive the sensing signal from the sensor unit 126 and determine the projection direction of the multi-mode lighting device 120 with respect to a horizontal level so as to control the operation mode of the multi-mode lighting device 120.

The multi-mode lighting device 120 is capable of operating in the lighting mode and the projection mode. By using a wireless projection technology, the user may transmit an image in the electronic device 110 to the multi-mode lighting device 120, so as to project the larger image to be shared with others. When the user does not want to watch the video or images, the multi-mode lighting device 120 can also be switched to the lighting mode, so as to illuminate space with high luminance and/or colorful light by using the lighting unit 123.

The multi-mode lighting device 120 may use the sensor unit 126 to detect the external events (e.g. determining a relationship of the projection direction and the space), and automatically changes the operation mode based on the external event. For instance (but the invention is not limited thereto), when the user moves the multi-mode lighting device 120 to face the wall, the processing unit 121 may automatically start a projection function (the projection mode) so the projection unit 124 may project the image shared by the electronic device 110. For instance, the processing unit 121 of the multi-mode lighting device 120 may establish a connection with the electronic device 110 through the wireless communication unit 120, and, through use of screen mirroring technologies such as WiFi display, AirPlay, Wireless Display (WiDi) and Miracast, which synchronously project an image displayed on the electronic device 110 based on the image signal provided from the electronic device 110. When the multi-mode lighting device 120 faces the ceiling or a desktop, the multi-mode lighting device 120 automatically becomes a floor lamp/desk lamp to light up the space. Accordingly, the lighting system 100 and the multi-mode lighting device 120 are capable of improving the convenience in use.

In one embodiment, the motor control module 125 is electronically connected to the processing unit 121. Under control of the processing unit 121, the motor control module 125, which may include a driver and a motor connecting to the projection unit 124, may adjust the projection direction of the projection unit 124 and/or a rotation angle of the projection image (the image 320). It is assumed that the power connector 129 is locked into the lamp base 130 by a rotating method. In this case, the motor control module 125 may rotate the projection unit 124, for example, by using the same rotating method, so as to adjust a rotation angle of the image projected from the projection unit 124. The processing unit 121 controls the motor control module 125, based on the sensing result of the sensor unit 126 which obtains the relation between the projection direction and the horizontal level (e.g. the orientation or posture of the projection unit with respect to the horizontal level), to rotate the projection unit 124 so as to adjust the rotation angle of the image projected from the projection unit 124 in order to correct the image 320 in relative to viewers.

Figure 6:
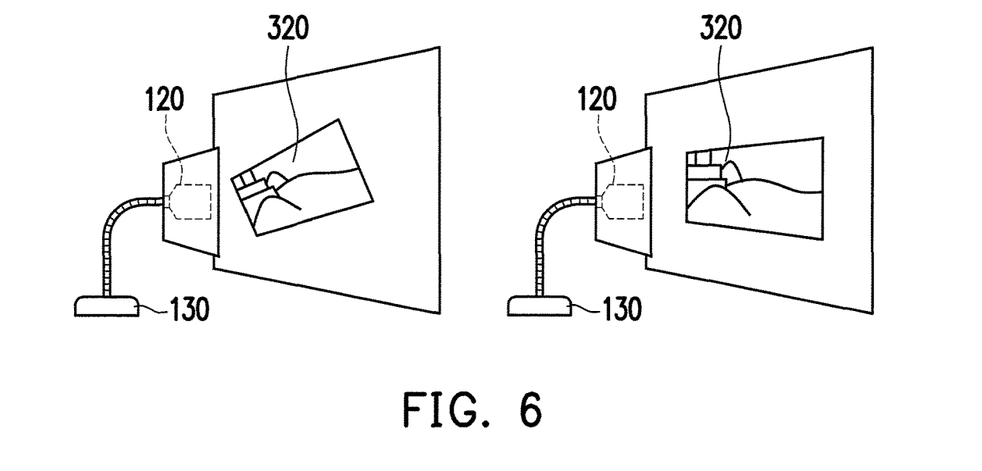
FIG. 6 is a diagram illustrating a scenario of application of the multi-mode lighting device depicted in FIG. 4 according to an embodiment of the invention.

For instance, FIG. 6 is a diagram illustrating a scenario of application of the multi-mode lighting device 120 depicted in FIG. 4 according to an embodiment of the invention. The multi-mode lighting device 120 is built-in with the sensor unit 126 in order to sense the rotation angle of the image projected from the projection unit 124 based on sensing result of the sensor unit 126. As such, the user does not need to make great effort to adjust the horizontal level of the projected image 320 but simply move the multi-mode lighting device 120 to face the wall, so that the image 320 may be automatically corrected by the processing unit 121 of the multi-mode lighting device 120, which is easy to install and convenient to use.

Figure 7:
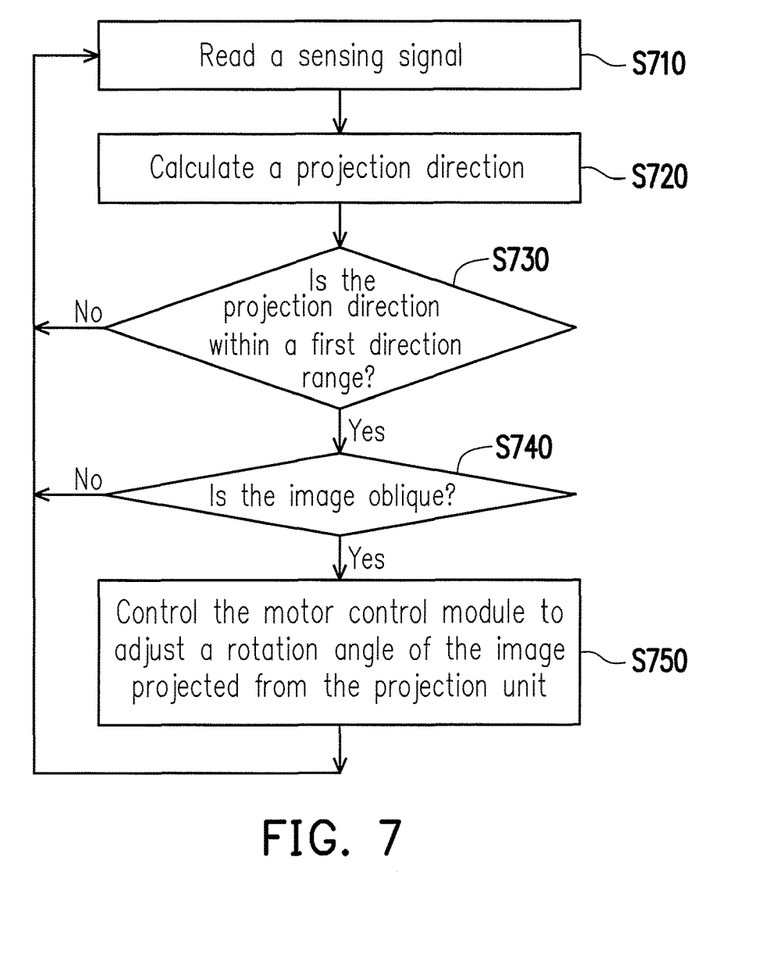
FIG. 7 is a flowchart illustrating operations of automatically correcting the rotation angle of the image by the multi-mode lighting device depicted in FIG. 4 according to an embodiment of the invention.

FIG. 7 is a flowchart illustrating operations of automatically correcting the rotation angle of the image projected by the multi-mode lighting device 120 depicted in FIG. 4 according to an embodiment of the invention. The processing unit 121 reads the sensing signal provided by the sensor unit 126 in step S710, and calculates/determines the projection direction of the multi-mode lighting device 120 based on the sensing signal in step S720. In step S730, the processing unit 121 may determine whether the projection direction of the multi-mode lighting device 120 is within the first direction range. When determining that the projection direction of the multi-mode lighting device 120 is not within the first direction range in step S730, it indicates that the operation mode of the multi-mode lighting device 120 is not the projection mode, and thus the processing unit 121 executes step S710 again.

When determining that the projection direction of the multi-mode lighting device 120 is within the first direction range in step S730, the processing unit 121 may operate in the projection mode and execute step 740. In step S740, the processing unit 121 may sense a relationship of the projection unit 124 and a ground by using the sensor unit 126. When determining that the image 320 projected by the projection unit 124 is not oblique in step S740, the processing unit 121 executes the step S710 again. When determining that the image 320 projected by the projection unit 124 is oblique in step S740, the processing unit 121 may execute step S750. In step S750, the processing unit 121 may calculate an angle and a direction for compensation that should be made, and drive the motor control module 125 to correspondingly rotate the projection unit 124 so that the projection unit 124 correct the rotation angle of the image to project a horizontal image (as illustrated in FIG. 6).

In some other embodiments, the sensor unit 126 may also include an image identification module (not shown). The image identification module is coupled to the processing unit 121. The image identification module may be used to identify an action of the user and provide an identification result to the processing unit 121. The processing unit 121 controls operations of the multi-mode lighting device 120 based on the identification result. As such, the user may perform a predetermined gesture (e.g., waving or other actions) in front of the multi-mode lighting device 120 to quickly control functions/operations (e.g., switching the mode, adjusting the brightness of the light from the lighting unit 123, etc.) of the multi-mode lighting device 120. In other embodiments, the processing unit 121 may transmit the identification result back to the electronic device 110. The electronic device 110 may control operations of the electronic device 110 based on the identification result (the gesture of the user). For example, during a playback of a movie of the electronic device 110, the multi-mode lighting device 120 may sense actions/gestures of the user and provide the identification result to the electronic device 110, so that the electronic device 110 may execute the corresponding operations (e.g., pausing the playback, or fast-forwarding the movie) based on the identification result.

In some other application scenarios, assuming that the multi-mode lighting device 120 operates in the lighting mode, the user may perform a gesture of "increasing the brightness" underneath the multi-mode lighting device 120 or in front of the multi-mode lighting device 120, so that the processing unit 121 may control the lighting unit 123 to increase the brightness of the illumination light 310. When the user wishes to change the color of the illumination light 310, the user may perform a gesture of "changing the color" (e.g., waving hand left and right with the palm towards the left or right), so that the processing unit 121 may control the lighting unit 123 to change the color of the illumination light 310. When watching a movie, the user may perform a gesture of "switching the mode" (e.g., drawing a circle), so that the processing unit 121 may switch to the projection mode. When the user wishes to play a game before bedtime, the user may perform a control gesture, so that the multi-mode lighting device 120 may transmit a control command corresponding to the control gesture back to the electronic device 110. Accordingly, a game image of the electronic device 110 may be projected onto the projection screen or other objects via the multi-mode lighting device 120, so that the user may play the game executed by the electronic device 110 by using the gesture.

The multi-mode lighting device 120 may be used as an installation art for various applications or used for healthy living. For example, for saving stamina, people may prefer to wait for the elevator instead of taking the stairs. Taking the elevator not only results in lack of exercise but also leads to waste of electricity. By installing the multi-mode lighting device 120 at stairwell, the image 320 may be projected to act in concert with an artistic space. With use of a brightness sensing module and an image identification module in the sensor unit 126, the image 320 projected by the multi-mode lighting device 120 may interact with people, time and space at the corresponding location. For instance, the multi-mode lighting device 120 may project the image 320 differently in response to daytime and nighttime. In another example, when people are taking the stairs, the color and/or the image projected by the multi-mode lighting device 120 may be changed accordingly to display texts such as calorie consumed or cheering words so as to encourage people to take the stairs. The multi-mode lighting device 120 may even operate in conjunction with products to project advertising contents of the products to accomplish the effect of product placement.

In one embodiment, the multi-mode lighting device 120 is used to project an image or a video onto the ceiling. The user may lie down on the bed to watch a video/an image. If the user sleeps while the multi-mode lighting device 120 is still projecting, it will waste electricity, and sound and light from the video can result in poor sleep quality of the user. The multi-mode lighting device 120 is capable of sensing a state of the user to automatically turn off the projection without influencing the sleep quality of the user while realizing an effect of saving power.

Figure 8:
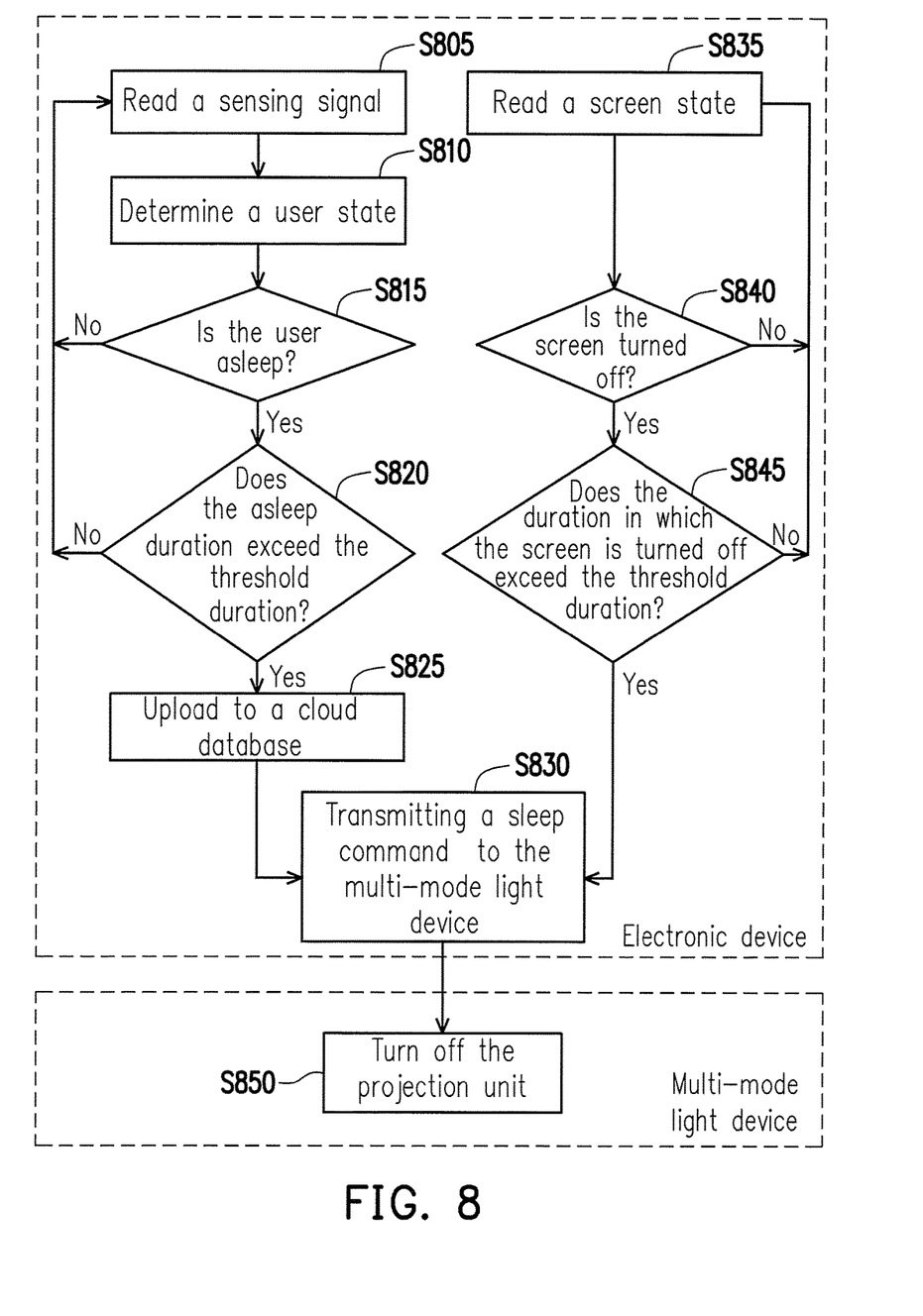
FIG. 8 is a flowchart illustrating operations of automatically saving energy by the multi-mode lighting device depicted in FIG. 4 according to an embodiment of the invention.

FIG. 8 is a flowchart illustrating operations of automatically saving energy by the multi-mode lighting device 120 depicted in FIG. 4 according to an embodiment of the invention. After the user's electronic device 110 (e.g., a mobile device) is connected to the multi-mode lighting device 120, the multi-mode lighting device 120 may project the image of the electronic device 110 onto the ceiling, the wall, or the projection screen. The electronic device 110 may read a sensing signal from an internal gyro and/or other sensors in step S805, and determine a user state (a physiological condition of the user) based on the sensing signal in step S810. In step S815, the electronic device 100 may determine whether the user is asleep. If the sensing signal remains unchanged, it indicates that the electronic device 110 may be placed on the table away from the user. If the sensing signal shows an irregular variation, it indicates that the user is still in activity (not yet asleep). If the sensing signal shows a regular variation, the electronic device 110 may consider this as a stable breathing state and determine that the user is asleep.

When determining that the user is asleep in step S815, the electronic device 110 may execute step S820. In step S820, the electronic device 110 may determine whether a sleep duration of the user is maintained for a predetermined duration (a threshold duration TH1). When the sleep duration of the user exceeds the threshold duration TH1, the electronic device 110 may execute step S825. In step S825, the electronic device 110 may upload information regarding the user's time to sleep, a sleep duration, and/or an operation history of the multi-mode lighting device 120 to a cloud database (not illustrated). The time information of sleep and habits of the user may be transmitted to the cloud database to serve as parameters of determining the operation in the next time, so as to improve accuracy of determining whether the user is truly asleep. Details regarding the cloud database will be described later.

After step S825, the electronic device 110 may execute step S830. In step S830, the electronic device 110 may transmit a sleep command (the wireless control signal) to the multi-mode lighting device 120. When the processing unit 121 of the multi-mode lighting device 120 receives the sleep command, the processing unit 121 may turn off the projection unit 124 in step S850 to avoid influencing the sleep quality of the user while realizing an effect of saving power. In some other embodiments, the multi-mode lighting device 120 further includes a night-lamp mode. The processing unit 121 of the multi-mode lighting device 120 may switch the operation mode to the night-lamp mode in step S850, so as to control the lighting unit 123 to provide a night-lamp light with low luminance and turn off the projection unit 124.

In some other embodiments, the lighting system 100 may further include a wearable device (not shown). The wearable device can be worn on human body to sense physiological information (e.g., a heart rate, a respiration rate or other physiological features) of the user and provide the physiological information to the electronic device 110 via a wired transmission interface or a wireless transmission interface. In step S810, the electronic device 110 may generate the user state based on the physiological information provided by the wearable device (not shown). In step S815, the electronic device 110 may determine whether the user is asleep based on the user state.

The electronic device 110 may execute step S835 to read a parameter of a screen power module therein. In step S840, the electronic device 110 may determine whether the screen is turned off based on the parameter of the screen power module. When determining that the screen is turned off in step S840, the electronic device 110 may execute step S845. In step S845, the electronic device 110 may determine whether a duration in which the screen is turned off is maintained for a predetermined duration (a threshold duration TH2). When determining that the duration in which the screen is turned off exceeds the threshold duration TH2 in step S845, the electronic device 110 may determine that the user may not use the cell phone. In this case, the electronic device 110 may transmit the sleep command to the multi-mode lighting device 120 in step S830, so that the multi-mode lighting device 120 may turn off the projection unit 124 to enter a sleep mode in step S850.

The operation of the multi-mode lighting device 120 for saving power is not limited to the above. For instance, in some other embodiments, the processing unit 121 of the multi-mode lighting device 120 may monitor the image 320 (or monitor the video signal provided by the electronic device 110). When the image 320 is a still picture and maintained for a threshold duration TH3, the processing unit 121 may turn off the projection unit 124 to avoid influencing the sleep quality of the user while realizing an effect of saving power.

In some other embodiments, the processing unit 121 of the multi-mode lighting device 120 may receive a usage state provided by the electronic device 110 via the wireless communication unit 122. When the usage state indicates that the screen of the electronic device 110 is turned off and maintained for the threshold duration TH2, the processing unit 121 of the multi-mode lighting device 120 may turn off the projection unit 124.

In some other embodiment, the electronic device 110 may use a sensor therein to detect the user state. Alternatively, the wearable device (not shown) worn by the user may sense the physiological information of the user, and provide the physiological information to the electronic device 110 via wireless connection. The electronic device 110 may generate the user state based on the physiological information. The electronic device 110 may then transmit the user state to the multi-mode lighting device 120. The processing unit 121 of the multi-mode lighting device 120 may receive the usage state provided by the electronic device 110 via the wireless communication unit 122. When the user state indicates that the user is asleep, the processing unit 121 may turn off the projection unit 124.

In some other embodiment, the wearable device (not shown) may sense the physiological information of the user. The wearable device may generate the user state based on the physiological information. The wearable device may transmit the user state to the multi-mode lighting device 120. The processing unit 121 of the multi-mode lighting device 120 may receive the usage state provided by the wearable device via the wireless communication unit 122. When the user state indicates that the user is asleep, the processing unit 121 may turn off the projection unit 124.

In still some other embodiments, the multi-mode lighting device 120 further includes the night-lamp mode. When the user state provided by the electronic device 110 indicates that the user is asleep, the processing unit 121 of the multi-mode lighting device 120 may switch the operation mode to the night-lamp mode, so as to control the lighting unit 123 to provide the night-lamp light with low luminance and turn off the projection unit 124.

In some other embodiments, the multi-mode lighting device 120 further includes a speaker 127. The speaker 127 is coupled to the processing unit 121. During the playback of the movie, in addition to an image of the movie projected by the projection unit 124, the processing unit 121 may also control the speaker 127 to emit a sound of the movie. When the user state provided by the electronic device 110 indicates that the user is asleep, the processing unit 121 of the multi-mode lighting device 120 may turn down volume of the speaker 127 or turn off the speaker 127 to avoid influencing the sleep quality of the user while realizing an effect of saving power.

In some other embodiments, when the user state provided by the electronic device 110 indicates that the user is asleep, the processing unit 121 of the multi-mode lighting device 120 may turn up the volume of the speaker 127 to wake up the user, which can be used as an alarm clock. For example, when a late-night live football game is projected by using the multi-mode lighting device 120, the user may set up the alarm clock function of the multi-mode lighting device 120. As such, when it is detected that the user is asleep, the processing unit 121 may increase the volume of the speaker 127. The user may be woken up by increasing the volume of the speaker 127 to avoid missing the key goal in the game.

In some embodiments, the processing unit 121 of the multi-mode lighting device 120 may record and analyze the operation history of the multi-mode lighting device 120 to obtain information regarding an operation habit, and automatically control operations of the multi-mode lighting device 120 based on the operation habit. The information regarding the operation habit may be recorded into a non-volatile memory (not shown) in the multi-mode lighting device 120, or uploaded to the cloud database via the wireless communication unit 122.

Figure 9:
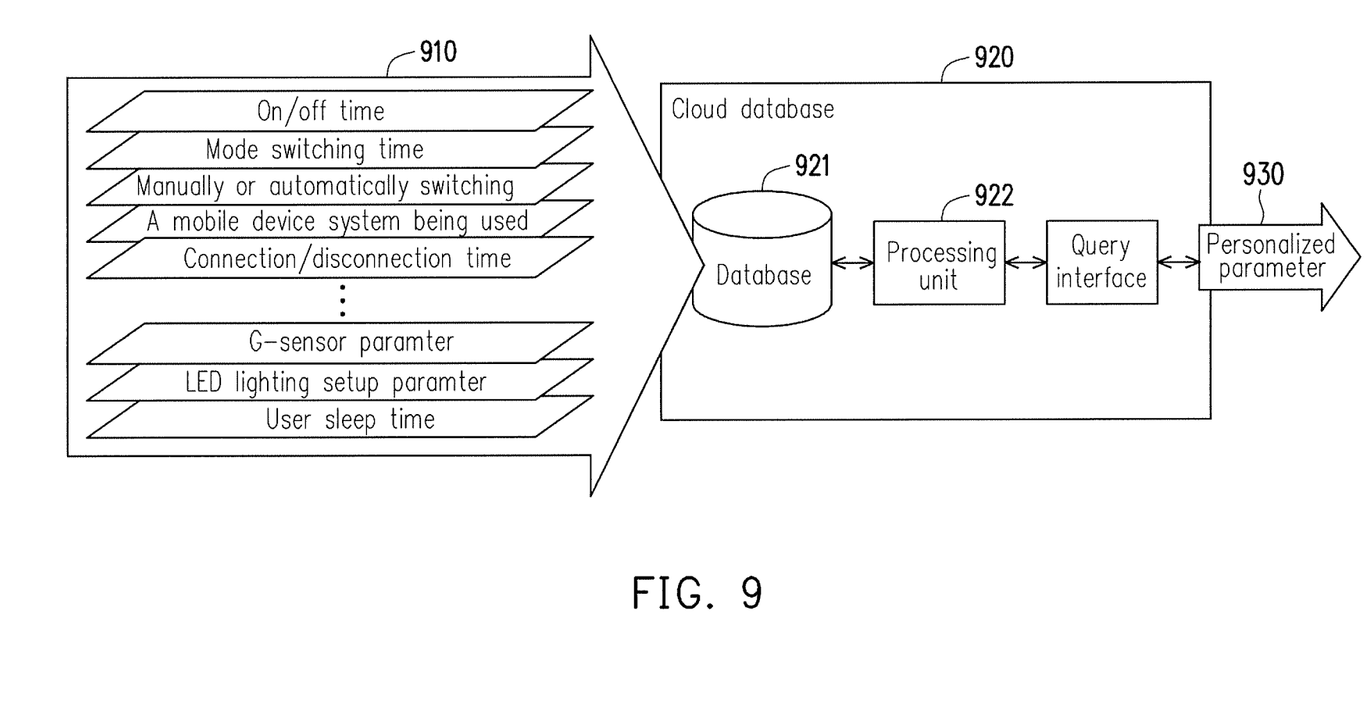
FIG. 9 is a functional block diagram illustrating a cloud database according to an embodiment of the invention.

FIG. 9 is a functional block diagram illustrating a cloud database 920 according to an embodiment of the invention. The cloud database 920 includes a database 921 and a processing unit 922. The multi-mode lighting device 120 uploads operation habit information 910 to the database 921 of the cloud database via the wireless communication unit 122. Based on different design requirements, the operation habit information 910 may include an on/off time of the multi-mode lighting device 120, a mode switching time, a mode switching cause (manually or automatically switching), identification information of the electronic device 110, wireless connection/disconnection time, sensing result of the sensor unit 126, a setup parameter of the lighting unit 123 or other configuration parameters, operation history of the user, the sleep duration of the user, or other user information. The processing unit 922 is coupled to the database 921 in order to access the operation habit information.

The processing unit 922 may perform a data analysis, a data statistic and/or a data mining on the operation habit information stored in the database 921. For instance (but the invention is not limited thereto), based on the operation habit information, the processing unit 922 may obtain a frequency of the multi-mode lighting device 120 operated in the lighting mode (or the projection mode), a usage time distribution of the multi-mode lighting device 120, information about the type of the electronic device 110 frequently connected to the multi-mode lighting device 120, a usage time of the lighting unit 123, or a daily routine of the user.

For example (but the invention is not limited thereto), it is assumed that records of a sleep duration distribution of the user is already present in the database 921, as shown in Table 1 below. In Table 1, "T" denotes that the state of the user is determined as asleep in the corresponding time period, and "F" denotes that the state of the user is determined as awake in the corresponding time period.

TABLE 1

| An example of the contents in the database 921 | | | | | | | | | | |
|---|---|---|---|---|---|---|---|---|---|---|
| Time | Date 1 | Date 2 | Date 3 | Date 4 | Date 5 | Date 6 | Date 7 | Total | Probability of asleep | Probability of awake |
| 0:01~2:00 | T | T | T | T | T | T | T | 7 | 23.33% | 76.67% |
| 2:01~4:00 | T | T | T | T | T | T | T | 7 | 23.33% | 76.67% |

TABLE 1-continued

An example of the contents in the database 921

| Time | Date 1 | Date 2 | Date 3 | Date 4 | Date 5 | Date 6 | Date 7 | Total | Probability of asleep | Probability of awake |
|---|---|---|---|---|---|---|---|---|---|---|
| 4:01~6:00 | T | T | F | T | F | T | T | 5 | 16.67% | 83.33% |
| 6:01~8:00 | T | F | F | F | F | F | T | 2 | 6.67% | 93.33% |
| 8:01~10:00 | F | F | F | F | F | F | F | 0 | 0.00% | 100.00% |
| 10:01~12:00 | F | F | F | F | F | F | F | 0 | 0.00% | 100.00% |
| 12:01~14:00 | T | F | F | F | F | F | T | 2 | 6.67% | 93.33% |
| 14:01~16:00 | T | F | F | F | F | F | T | 2 | 6.67% | 93.33% |
| 16:01~18:00 | F | F | F | F | F | F | T | 1 | 3.33% | 96.67% |
| 18:01~20:00 | F | F | F | F | F | F | F | 0 | 0.00% | 100.00% |
| 20:01~22:00 | F | F | F | F | F | F | F | 0 | 0.00% | 100.00% |
| 22:01~0:00 | T | F | F | T | T | T | F | 4 | 13.33% | 86.67% |
|  |  |  |  |  |  |  |  | 30 |  |  |

With reference to Table 1, for example, the processing unit 922 may speculate probability of awake for the user at each time period per day according to the records (the sleep duration distribution) in the database 921. Formula 1 below may adopt the probability of awake to calculate a threshold value Threshold(T) at a time T to be served as a personalized parameter 930. A query interface of the cloud database 920 may provide the personalized parameter 930 to the electronic device 110 and/or the multi-mode lighting device 120. In one embodiment, the threshold value Threshold(T) may be used to facilitate in determining whether the user is truly asleep.

$$\text{Threshold}(T) = \text{Basic\_Threshold} + \text{Offset\_Threshold} \quad \text{Formula 1}$$

In Formula 1, Basic_Threshold is a constant. Basic_Threshold may be decided based on design requirements (e.g., Basic_Threshold may be set to be 10 or other real number). In Formula 1, Offset_Threshold=C*Pa(T), wherein C is a real number, and Pa(T) denotes the probability of awake at the time T. Referring to Table 1, the probability of awake Pa(9:00) at the time 9:00 is 100.00%. C may be decided based on design requirements (e.g., C may be set to be 40 or other real number).

For instance, the threshold value Threshold(T) at the time period 0:01~2:00 is equal to 10+40*Pa(T)=10+40*76.67%=31, which means that, during the time period 0:01~2:00, when the sensing signal of an internal sensor of the electronic device 110 does not have no dramatic changes for 31 consecutive units of time, it is then confirmed that the user is asleep. As another example, the threshold value Threshold(T) at the time period 8:01~10:00 is equal to 10+40*Pa(T)=10+40*100%=50, which means that, during the time period 8:01~10:00, only when the sensing signal of the internal sensor of the electronic device 110 does not have no dramatic changes for 50 consecutive units of time, it is confirmed that the user is asleep. In other words, during the period in which the user is in activities, if the threshold value Threshold(T) for determining whether the user is asleep is higher, probability of a misjudgment may be reduced accordingly. With increases in the time for learning, an amount of samples obtained is also increased and more accurate, and the threshold value Threshold(T) may also be adjusted to increase its accuracy.

The misjudgment may occur if only one single data of the internal sensor of the electronic device 110 is used to determine whether the user is asleep. Accuracy of determination may be improved if a synthetic judgment can be conducted by combining use of querying for statistical values of the sleep duration of the user from the database 921 together with a weight distribution method.

Different users may have different ways of use and habits. The electronic device 110 and/or the multi-mode lighting device 120 may upload a usage event of the user to the cloud database 920. The usage event of the user may include an operation of an application, a parameter of the electronic device 110, a usage history of the multi-mode lighting device 120, and so on. The processing unit 922 of the cloud database 920 performs the data analysis, the data statistic and the data mining on the accumulating data, so as to convert the data in the database 921 into the meaningful personalized parameter 930 (the operation habit information). The processing unit 121 of the multi-mode lighting device 120 is connected to the cloud database 920 via the wireless communication unit 122. Accordingly, the processing unit 121 of the multi-mode lighting device 120 may download the personalized parameter 930 via the query interface (not shown) of the cloud database 920. The processing unit 121 may automatically control operations of the multi-mode lighting device 120 based on the personalized parameter 930. Detailed operations regarding the multi-mode lighting device 120 may refer to related description in the foregoing embodiments, which are not repeated hereinafter. With accumulation of the data, correctness of a learning result may become enhance.

For instance, a user may have the following habit: going home at 7 PM, and turning on and setting the multi-mode lighting device 120 to the lighting mode; going to bed at 11 PM after setting the multi-mode lighting device 120 to the night-lamp mode; and leaving home the next day at 8 AM after turning off the multi-mode lighting device 120. The multi-mode lighting device 120 is capable of learning a usage habit of the user, so that the multi-mode lighting device 120 may be automatically turned on, adjusted to the correct operation mode, and even automatically turned off. Accordingly, the user may not worry about, for example, forgetting to turn off the light before going out or not finding the switch because the room is too dark when the user comes home. The night-lamp mode automatically turned on by the multi-mode lighting device 120 at 11 PM may also be used to remind the user that it is time to go to bed.

The future is moving on to the era that the Internet of Things (IoT) is used to connect almost everything together. By using application programming interfaces (API) from different devices, the user is able to obtain information regarding all objects on the IoT. The multi-mode lighting device 120 may communicate and interact with different devices on the IoT at home. The processing unit 121 may be connected to the IoT via the wireless communication unit 122. The processing unit 121 may receive state information of an external device on the IoT. The processing unit 121 may automatically control operations of the multi-mode lighting device 120 based on the state information.

For instance, a smart television (the external device) may interact with the multi-mode lighting device 120. When the user is watching the movie on the smart television, the smart television may send a command of "dimming the light" (the state information) via the IoT. After the command of "dimming the light" is received, the multi-mode lighting device 120 may slowly reduces the brightness of the illumination light 310, so as to simulate a lighting when the movie is about to begin in the cinema.

In another example, it is assumed that a security system installed at the door is capable of connecting to the IoT. When there is a visitor who presses the doorbell, the security system sends a notification command to the IoT. After the notification command is received, the multi-mode lighting device 120 may change the illumination light 310 to corresponding color or breathing light (winking light). Accordingly, people with poor hearing ability (e.g. hearing disorder) or people at different floor who have trouble hearing the doorbell ringing may be informed of activities at the door through the change of the illumination light 310 emitted by the multi-mode lighting device 120.

The multi-mode lighting device 120 may also collaborate with a digital assistant. Before going to bed, if the user speaks, for example, "wake me up tomorrow morning at seven, good night" to the electronic device 110 (e.g., the cell phone), the digital assistant operated on the electronic device 110 may then send a command regarding "the user is asleep" to the IoT. Accordingly, all the devices connected to the IoT may cooperate to perform corresponding actions. For example, an air conditioner connected to the IoT is automatically switched to a sleep mode, a television connected to the IoT is automatically turned off, computer and monitor connected to the IoT automatically enter the sleep, and the security system connected to IoT locks up the door. The multi-mode lighting device 120 connected to the IoT also enters the night-lamp mode at the same time.

The multi-mode lighting device 120 in one or more embodiments may selectively operate in one of the multiple modes. For example, the multi-mode lighting device 120 may selectively operate in the lighting mode in order to use the lighting unit 123 to provide the illumination light 310. Alternatively, the multi-mode lighting device 120 may selectively operate in the projection mode in order to use the projection unit 124 to project the image 320. In some application examples, the multi-mode lighting device 120 may automatically change the operation mode based on the external event. Accordingly, the lighting system 100 and the multi-mode lighting device 120 are capable of improving the convenience in use.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art after reading the disclosure. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lighting system, comprising:
   an electronic device; and
   a multi-mode lighting device, the multi-mode lighting device comprising:
      a wireless communication unit, configured to establish a connection with the electronic device;
      a lighting unit, configured to provide illumination light;
      a projection unit, configured to project an image; and
      a processing unit, coupled to the wireless communication unit, the lighting unit, and the projection unit, and configured to selectively operate in one of multiple modes, wherein the multiple modes comprise a lighting mode and a projection mode, the processing unit is adapted to control the lighting unit to provide the illumination light when the processing unit operates in the lighting mode, and the processing unit is adapted to receive a video signal provided by the electronic device via the wireless communication unit and control the projection unit to project the image based on the video signal when the processing unit operates in the projection mode,
   wherein the processing unit is further configured to automatically switch between the lighting mode and the projection mode based on a current projection direction of the illumination light or the image from the multi-mode lighting device, so that
   when the multi-mode lighting device is in the lighting mode and it is determined by the processing unit based on a sensing signal provided by a sensor unit that the current projection direction of the multi-mode lighting device is within a first direction range, the processing unit is configured to switch automatically from the lighting mode to the projection mode, and
   when the multi-mode lighting device is in the projection mode and it is determined by the processing unit based on the sensing signal provided by the sensor unit that the current projection direction of the multi-mode lighting device is within a second direction range, the processing unit is configured to switch automatically from the projection mode to the lighting mode, wherein the current projection direction corresponds to an orientation or a posture of the multi-mode lighting device with respect to a horizontal level, and the first direction range does not overlap the second direction range.

2. The lighting system according to claim 1, wherein the lighting unit comprises at least one light emitting diode, and the processing unit is configured to control the at least one light emitting diode to emit corresponding color light in the lighting mode.

3. The lighting system according to claim 1, wherein the processing unit is adapted to disable the projection unit and control the lighting unit to provide the illumination light when the processing unit operates in the lighting mode.

4. The lighting system according to claim 1, wherein the processing unit is adapted to control the projection unit to project an illumination image and control the lighting unit to provide the illumination light when the processing unit operates in the lighting mode.

5. The lighting system according to claim 1, wherein the processing unit is adapted to disable the lighting unit and control the projection unit to project the image based on the video signal when the processing unit operates in the projection mode.

6. The lighting system according to claim 1, wherein the multi-mode lighting device further comprises:
a sensor unit, coupled to the processing unit, and configured to sense an external event to provide a sensing signal to the processing unit.

7. The lighting system according to claim 6, wherein the multi-mode lighting device further comprises:
a motor control module, coupled to the processing unit, and configured to adjust a projection direction of the projection unit or a rotation angle of the image projected from the projection unit under control of the processing unit.

8. The lighting system according to claim 7, wherein the processing unit is adapted to control the motor control module based on a sensing result of the sensor unit to adjust the rotation angle of the image projected from the projection unit to correct the image.

9. The lighting system according to claim 1, wherein the multi-mode lighting device further comprises:
a power connector, configured to connect a lamp base and supply power to the multi-mode lighting device, wherein the power connector is locked into the lamp base by a rotating method.

10. The lighting system according to claim 6, wherein the sensor unit comprises:
an image identification module, coupled to the processing unit, and configured to sense an action of a user and provide an identification result to the processing unit, wherein the processing unit is adapted to control operations of the multi-mode lighting device based on the identification result.

11. The lighting system according to claim 1, wherein the processing unit is configured to monitor the image, and is adapted to turn off the projection unit when the image is a still picture and maintained for a threshold duration.

12. The lighting system according to claim 1, wherein the processing unit is configured to receive a usage state provided by the electronic device via the wireless communication unit, and is adapted to turn off the projection unit when the usage state indicates that a screen of the electronic device is turned off and maintained for a threshold duration.

13. The lighting system according to claim 1, wherein the multiple modes further comprise a night-lamp mode, the processing unit is adapted to switch an operation mode to the night-lamp mode to control the lighting unit to provide night-lamp light when the user state indicates that the user is asleep.

14. The lighting system according to claim 1, wherein the multi-mode lighting device further comprises:
a speaker, coupled to the processing unit, and configured to emit a sound under control of the processing unit,
wherein the processing unit is adapted to turn down volume of the speaker when the user state indicates that the user is asleep.

15. The lighting system according to claim 1, wherein the multi-mode lighting device further comprises:
a speaker, coupled to the processing unit, and configured to emit a sound under control of the processing unit,
wherein the processing unit is adapted to turn up volume of the speaker to wake up the user when the user state indicates that the user is asleep.

16. The lighting system according to claim 1, wherein the processing unit is configured to record and analyze an operation history of the multi-mode lighting device to obtain an operation habit, and automatically control operations of the multi-mode lighting device based on the operation habit.

17. The lighting system according to claim 16, wherein the processing unit is adapted to connect to a cloud database via the wireless communication unit and update the operation habit to the cloud database.

18. The lighting system according to claim 1, wherein the processing unit is adapted to connect to a cloud database via the wireless communication unit, the processing unit is configured to download an operation habit, and the processing unit is adapted to automatically control operations of the multi-mode lighting device based on the operation habit.

19. The lighting system according to claim 1, wherein the processing unit is connected to an Internet of Things via the wireless communication unit, the processing unit is configured to receive state information from an external device on the Internet, and the processing unit is adapted to automatically control operations of the multi-mode lighting device based on the state information.

20. The lighting system according to claim 1, wherein the processing unit is adapted to receive a wireless control signal from the electronic device via the wireless communication unit, and selectively operate in one of the multiple modes based on the wireless control signal.

21. The lighting system according to claim 6, wherein the processing unit is adapted to switch an operation mode to the projection mode when the processing unit determines the external event as a projection direction of the multi-mode lighting device that is within a first direction range, and the processing unit is adapted to switch the operation mode to the lighting mode when the processing unit determines the external event as the projection direction of the multi-mode lighting device that is within a second direction range.

22. A multi-mode lighting device, comprising:
a wireless communication unit, configured to establish a connection with an electronic device external to the multi-mode lighting device;
a lighting unit, configured to provide illumination light;
a projection unit, configured to project an image; and
a processing unit, coupled to the wireless communication unit, the lighting unit, and the projection unit, and configured to selectively operate in one of multiple modes, wherein the multiple modes comprise a lighting mode and a projection mode, the processing unit is adapted to control the lighting unit to provide the illumination light when the processing unit operates in the lighting mode, and the processing unit is adapted to receive a video signal provided by the electronic device via the wireless communication unit and control the projection unit to project the image based on the video signal when the processing unit operates in the projection mode, wherein the processing unit is further configured to automatically switch between the lighting mode and the projection mode based on a current projection direction of the illumination light or the image from the multi-mode lighting device, so that when the multi-mode lighting device is in the lighting mode and it is determined by the processing unit based on a sensing signal provided by a sensor unit that the current projection direction of the multi-mode lighting device is within a first direction range, the processing unit is configured to switch automatically from the lighting mode to the projection mode, and when the multi-mode lighting device is in the projection mode and it is determined by the processing unit based on the sensing signal provided by the sensor unit that the current projection direction of the multi-mode lighting device is within a second direction range, the processing unit is configured to switch automatically from the projection mode to the lighting mode, wherein the current projection direction corresponds to an orientation or a posture of the multi-mode lighting device with respect to a horizontal level, and the first direction range does not overlap the second direction range.

23. A controlling method of a multi-mode lighting device operating in a lighting mode and a projection mode, the multi-mode lighting device comprising a processing unit and a sensor unit, the method comprising:

reading a sensing signal provided from the sensor unit by the processing unit;

determining a projection direction of the multi-mode lighting device according to the sensing signal the current projection direction corresponds to an orientation or a posture of the multi-mode lighting device with respect to a horizontal level;

determining whether the projection direction of the multi-mode lighting device is within a first direction range or a second direction range; and automatically switching by the processing unit between the lighting mode and the projection mode based on the projection direction of the illumination light or the image from the multi-mode lighting device that is determined, so that when the multi-mode lighting device is in the lighting mode and it is determined that the projection direction of the multi-mode lighting device is within the first direction range, the processing unit is configured to switch automatically from the lighting mode to the projection mode, and when the multi-mode lighting device is in the projection mode and it is determined that the projection direction of the multi-mode lighting device is within the second direction range which does not overlap with the first direction range, the processing unit is configured to switch automatically from the projection mode to the lighting mode.

24. The controlling method of the multi-mode lighting device according to claim 23, further comprises:

sensing a relationship between a projection unit of the multi-mode lighting device and a ground by using the sensor unit, determining whether an image projected from the projection unit is oblique, calculating an angle and a direction for a compensation, and correspondingly driving a motor control module of the multi-mode lighting device to rotate the projection unit so that the projection unit is corrected to project a horizontal image.

25. The controlling method of the multi-mode lighting device according to claim 23, further comprises:

determining whether the projection direction of the multi-mode lighting device is within a second direction range by the processing unit, and switching an operation mode to a lighting mode or a projection mode.

* * * * *